US012701423B2

(12) United States Patent
Kumar et al.

(10) Patent No.: US 12,701,423 B2
(45) Date of Patent: Aug. 4, 2026

(54) SYSTEMS AND METHODS FOR DETERMINING CLUSTERS OF SECTORS IN A TELECOM NETWORK

(71) Applicant: JIO PLATFORMS LIMITED, Ahmedabad (IN)

(72) Inventors: Shailesh Kumar, Hyderabad (IN); Anil Mittal, Hyderabad (IN); Prateek Kumar Jain, New Delhi (IN); Avnish Kumar, Delhi (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 617 days.

(21) Appl. No.: 18/246,277

(22) PCT Filed: Jul. 29, 2022

(86) PCT No.: PCT/IB2022/057060
§ 371 (c)(1),
(2) Date: Mar. 22, 2023

(87) PCT Pub. No.: WO2023/012623
PCT Pub. Date: Feb. 9, 2023

(65) Prior Publication Data
US 2023/0354045 A1     Nov. 2, 2023

(30) Foreign Application Priority Data
Jul. 31, 2021     (IN) ............................. 202121034537

(51) Int. Cl.
*H04W 16/10*          (2009.01)
*H04L 41/14*          (2022.01)
(52) U.S. Cl.
CPC ............. *H04W 16/10* (2013.01); *H04L 41/14* (2013.01)

(58) Field of Classification Search
CPC ..... H04W 16/10; H04W 24/02; H04W 16/18; H04W 16/24; H04L 41/14
See application file for complete search history.

(56) References Cited

U.S. PATENT DOCUMENTS 9,521,554 B2     12/2016    Farajidana et al.
11,641,579 B1 *   5/2023    Mukherjee ............ H04W 48/18
                                                    370/329
(Continued)

OTHER PUBLICATIONS

Asghar, Ahmad & Farooq, Hasan & Imran, Ali. (2018). Self-Healing in Emerging Cellular Networks: Review, Challenges and Research Directions. IEEE Communications Surveys & Tutorials. pp. 1-1. 10.1109/COMST.2018.2825786.

(Continued)

*Primary Examiner* — Schquita D Goodwin
(74) *Attorney, Agent, or Firm* — FINNEGAN, HENDERSON, FARABOW, GARRETT & DUNNER LLP

(57)                    ABSTRACT

Present disclosure generally relate to wireless networks, more particularly relates to systems and methods for determining spatial clusters in a network to enable connected community of telecommunication cellular towers. The system may prepare cell data using one or more circle data, city data, cell Identity (ID) data, latitude data, longitude data, azimuth data, and height data. System may compute geohash based on creating geohash neighbours and geohash bounding box data and compute sectors of the telecommunication towers. Further, the system may compute sector affinity of the telecommunication towers and perform clustering of the telecommunication towers.

20 Claims, 12 Drawing Sheets

(56) References Cited

U.S. PATENT DOCUMENTS

| | | | |
|---|---|---|---|
| 2020/0267580 A1* | 8/2020 | Gray | H04W 64/003 |
| 2021/0227403 A1* | 7/2021 | Tsui | H04W 24/02 |
| 2022/0095130 A1* | 3/2022 | Tullberg | H04W 24/02 |
| 2022/0207472 A1* | 6/2022 | Hashisho | G06V 20/13 |
| 2022/0240123 A1* | 7/2022 | Zeng | H04W 28/0983 |
| 2022/0286863 A1* | 9/2022 | Sarkar | H04W 24/02 |
| 2023/0015235 A1* | 1/2023 | Van Der Heijden | G01C 21/3881 |
| 2023/0318935 A1* | 10/2023 | Sergeev | H04L 41/0896 709/223 |
| 2024/0236698 A1* | 7/2024 | Lanfranchi | H04W 12/069 |

OTHER PUBLICATIONS

International Search Report from International Appl. No. PCT/IB2022/057060, mailed Nov. 9, 2022.

* cited by examiner

200

400A

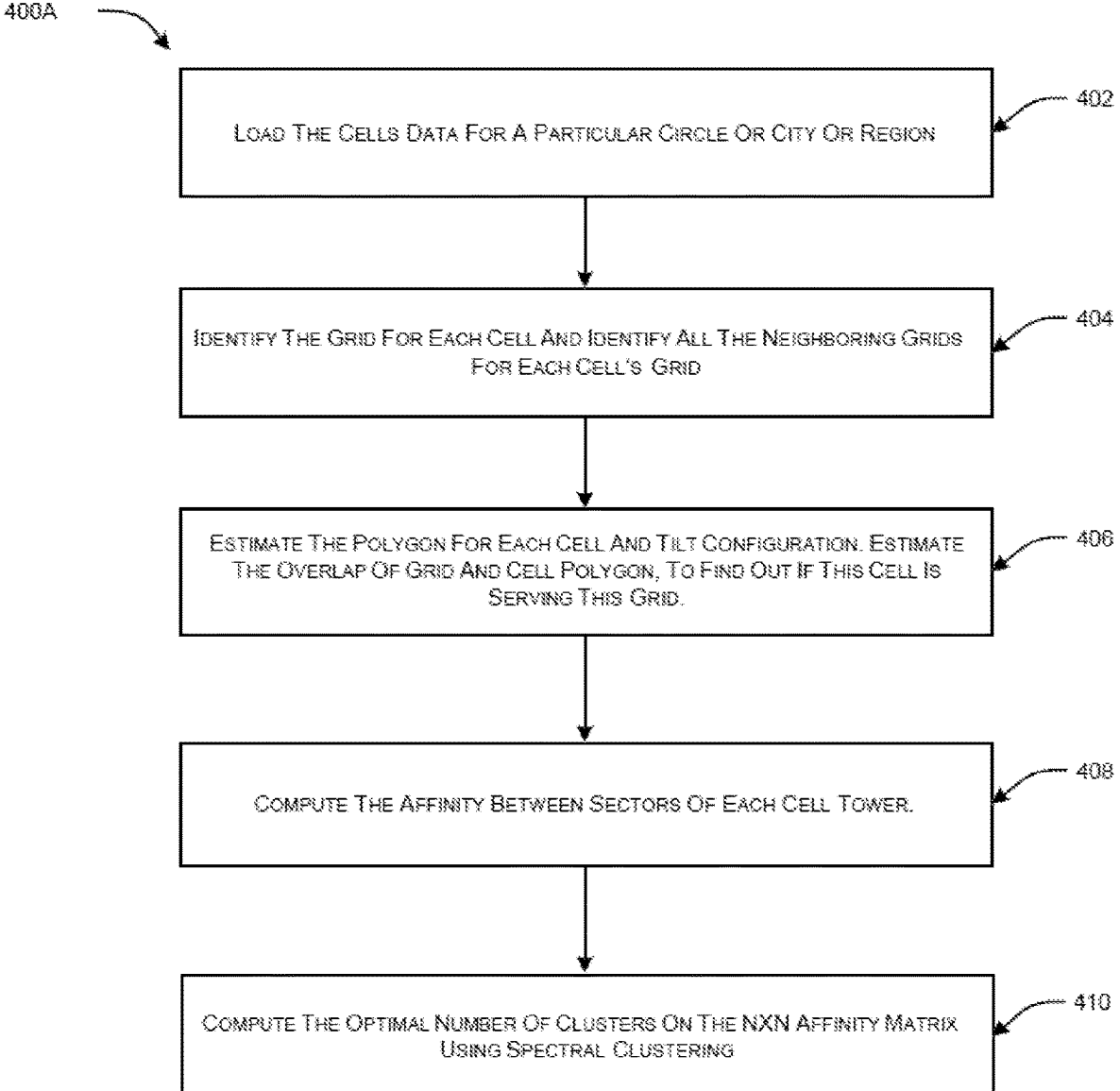

LOAD THE CELLS DATA FOR A PARTICULAR CIRCLE OR CITY OR REGION ⟋ 402

IDENTIFY THE GRID FOR EACH CELL AND IDENTIFY ALL THE NEIGHBORING GRIDS FOR EACH CELL'S GRID ⟋ 404

ESTIMATE THE POLYGON FOR EACH CELL AND TILT CONFIGURATION. ESTIMATE THE OVERLAP OF GRID AND CELL POLYGON, TO FIND OUT IF THIS CELL IS SERVING THIS GRID. ⟋ 406

COMPUTE THE AFFINITY BETWEEN SECTORS OF EACH CELL TOWER. ⟋ 408

COMPUTE THE OPTIMAL NUMBER OF CLUSTERS ON THE NXN AFFINITY MATRIX USING SPECTRAL CLUSTERING ⟋ 410

LOAD THE CELLS DATA FOR A PARTICULAR CIRCLE OR CITY OR REGION — 412

CREATE SECTOR ID BY COMBINING THE CELLS HAVING THE SAME LATITUDE, LONGITUDE AND AZIMUTH — 414

GET THE GEOHASH OF EACH CELLS' LOCATION, WHICH IS BASED ON LATITUDE AND LONGITUDE — 416

STORE CELLS DATA CONTAINING CIRCLE, CITY, SECTOR, CELL, GEOHASH, LATITUDE, LONGITUDE, AZIMUTH, HEIGHT — 418

400C

SELECT ALL THE DISTINCT GEOHASHES FROM THE CELLS DATA — 422

FOR EACH OF THE GEOHASHES, GET THE NEIGHBORING GEOHASH, WHICH ARE UPTO 'N' DISTANCE AWAY. HERE, DISTANCE MEAN THE NUMBER OF GEOHASHES BETWEEN THE TWO GEOHASH — 424

GET THE BOUNDING BOXES FOR EACH OF THE GEOHASH INCLUDING THE NEIGHBOURS — 426

STORE THE DATASETS: GEOHASH-NEIGHBOURS AND GEOHASH-BOUNDING BOX — 428

400D

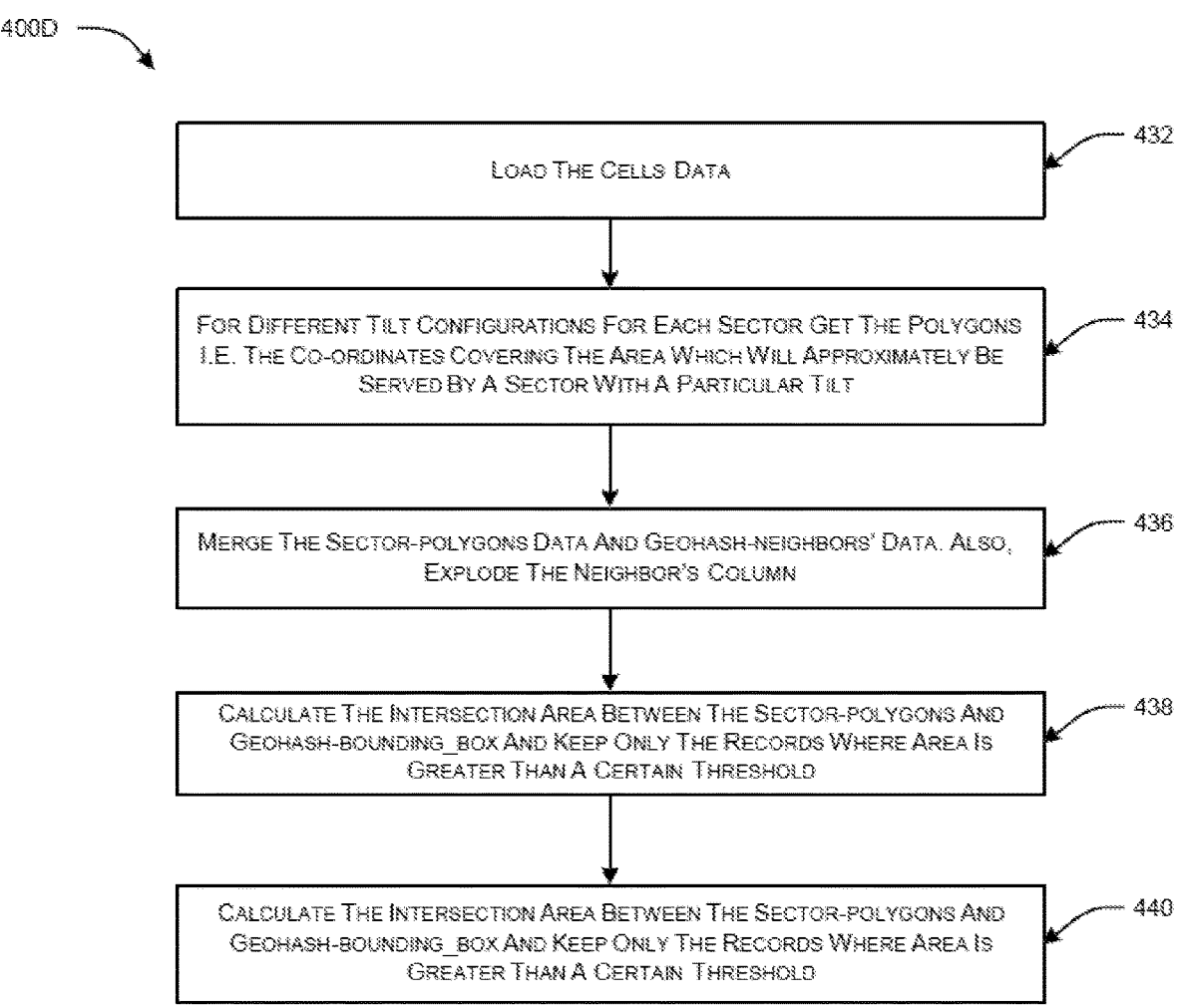

LOAD THE CELLS DATA ⟶ 432

FOR DIFFERENT TILT CONFIGURATIONS FOR EACH SECTOR GET THE POLYGONS I.E. THE CO-ORDINATES COVERING THE AREA WHICH WILL APPROXIMATELY BE SERVED BY A SECTOR WITH A PARTICULAR TILT ⟶ 434

MERGE THE SECTOR-POLYGONS DATA AND GEOHASH-NEIGHBORS' DATA. ALSO, EXPLODE THE NEIGHBOR'S COLUMN ⟶ 436

CALCULATE THE INTERSECTION AREA BETWEEN THE SECTOR-POLYGONS AND GEOHASH-BOUNDING_BOX AND KEEP ONLY THE RECORDS WHERE AREA IS GREATER THAN A CERTAIN THRESHOLD ⟶ 438

CALCULATE THE INTERSECTION AREA BETWEEN THE SECTOR-POLYGONS AND GEOHASH-BOUNDING_BOX AND KEEP ONLY THE RECORDS WHERE AREA IS GREATER THAN A CERTAIN THRESHOLD ⟶ 440

FIG. 4D

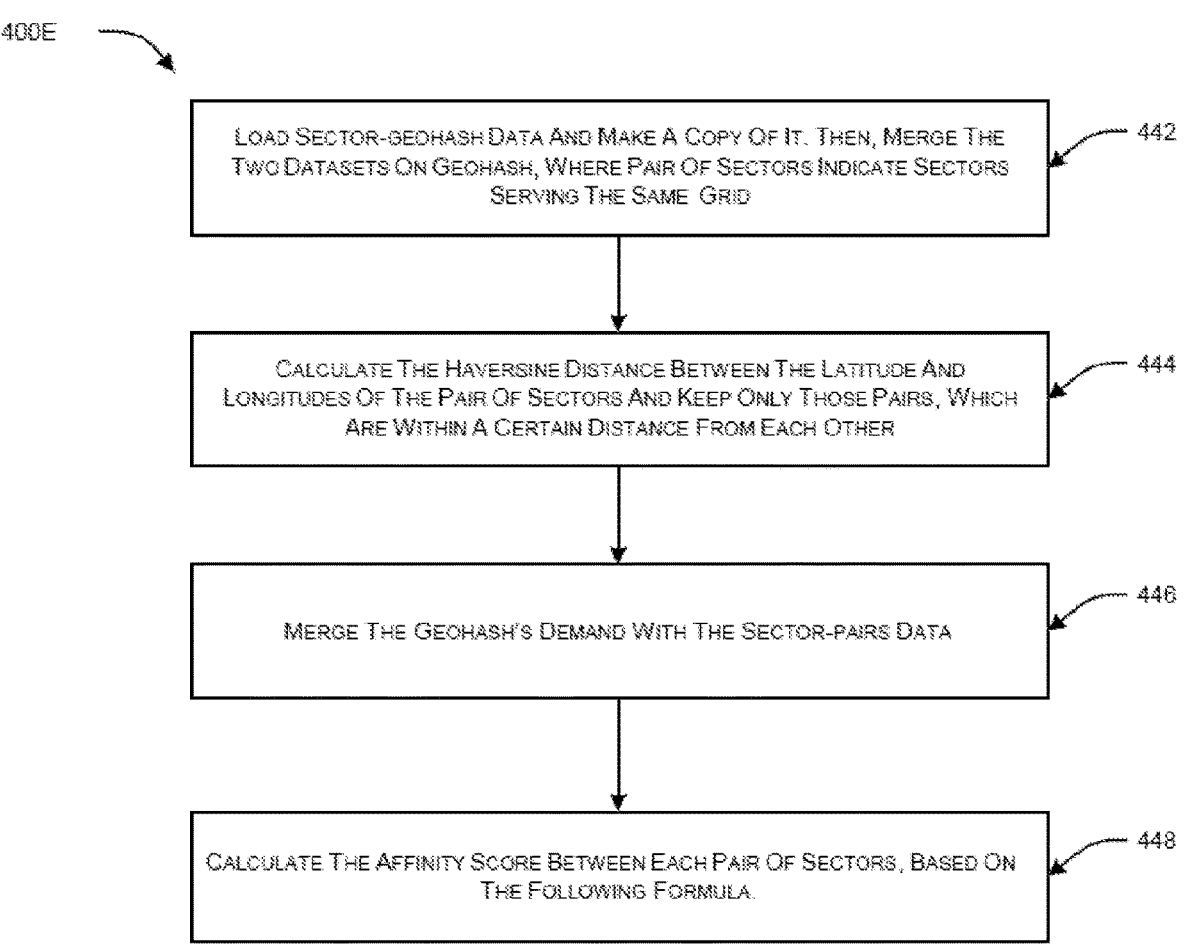

400E

LOAD SECTOR-GEOHASH DATA AND MAKE A COPY OF IT. THEN, MERGE THE TWO DATASETS ON GEOHASH, WHERE PAIR OF SECTORS INDICATE SECTORS SERVING THE SAME GRID — 442

CALCULATE THE HAVERSINE DISTANCE BETWEEN THE LATITUDE AND LONGITUDES OF THE PAIR OF SECTORS AND KEEP ONLY THOSE PAIRS, WHICH ARE WITHIN A CERTAIN DISTANCE FROM EACH OTHER — 444

MERGE THE GEOHASH'S DEMAND WITH THE SECTOR-PAIRS DATA — 446

CALCULATE THE AFFINITY SCORE BETWEEN EACH PAIR OF SECTORS, BASED ON THE FOLLOWING FORMULA. — 448

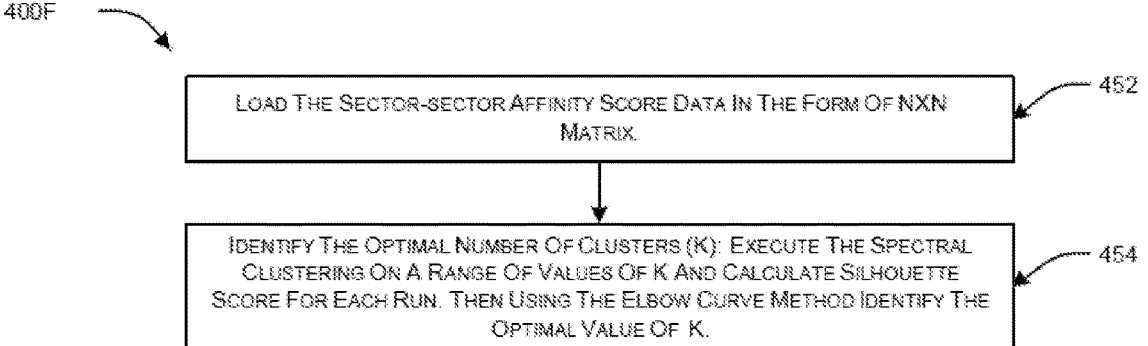

LOAD THE SECTOR-SECTOR AFFINITY SCORE DATA IN THE FORM OF NXN MATRIX. — 452

IDENTIFY THE OPTIMAL NUMBER OF CLUSTERS (K): EXECUTE THE SPECTRAL CLUSTERING ON A RANGE OF VALUES OF K AND CALCULATE SILHOUETTE SCORE FOR EACH RUN. THEN USING THE ELBOW CURVE METHOD IDENTIFY THE OPTIMAL VALUE OF K. — 454

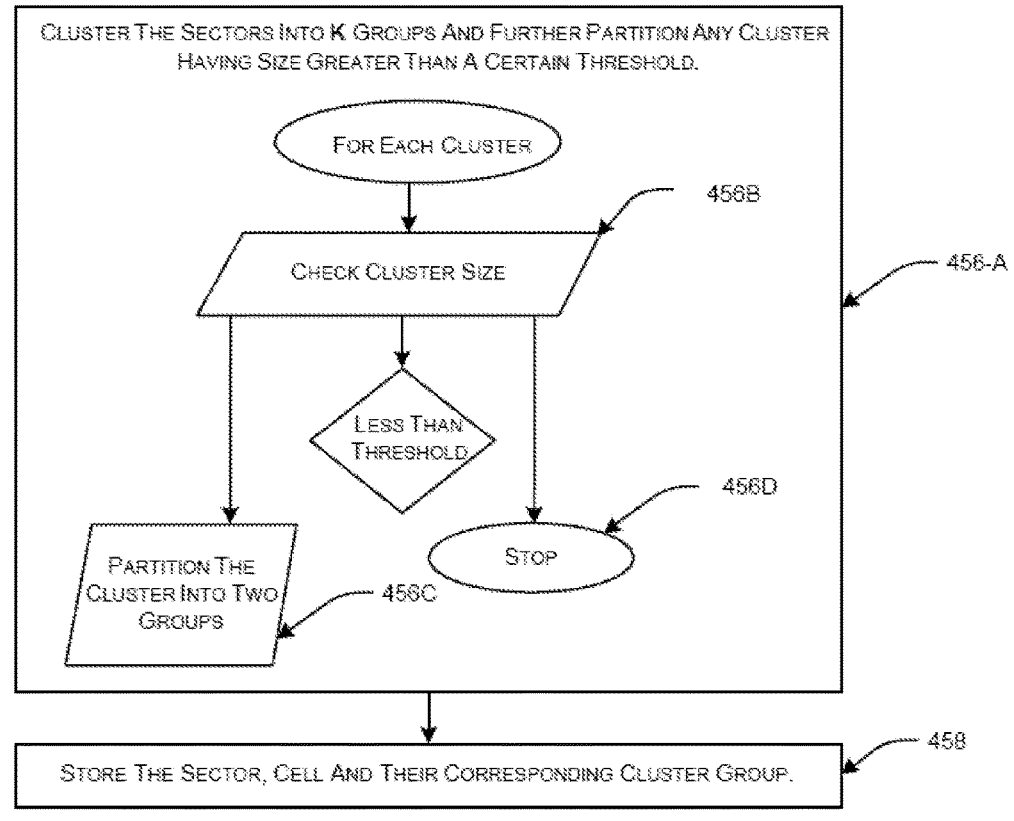

CLUSTER THE SECTORS INTO K GROUPS AND FURTHER PARTITION ANY CLUSTER HAVING SIZE GREATER THAN A CERTAIN THRESHOLD.

FOR EACH CLUSTER

CHECK CLUSTER SIZE — 456B

— 456-A

LESS THAN THRESHOLD

— 456D

PARTITION THE CLUSTER INTO TWO GROUPS — 456C

STOP

STORE THE SECTOR, CELL AND THEIR CORRESPONDING CLUSTER GROUP. — 458

FIG. 4F

SYSTEMS AND METHODS FOR DETERMINING CLUSTERS OF SECTORS IN A TELECOM NETWORK

FIELD OF INVENTION

The embodiments of the present disclosure generally relate to wireless networks. More particularly, the present disclosure relates to systems and methods for determining spatial clusters in a network to enable connected community of telecommunication cellular towers.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, network analysis may be growing field across many domains. The growing use of digital communication devices and platforms may have resulted in explosion of the quantity of data and stretched the abilities of current technologies to process this data and draw meaningful conclusions. Elucidation of network structural organization, connectedness, and relevance in complex environments may represent a challenge for network analysis. Network facilities may include one or more wireless networks containing various wireless devices, and wireless telecommunication towers. Telecommunication cellular towers in the wireless networks may need to be synchronized with each other as a coherent group. This may be necessary or desirable for various reasons, such as Radio Frequency (RF) planning, strategical decision making of new telecommunication cellular tower placement, supply demand optimization, and so on.

Conventional systems may not provide analysis of affinity between two telecommunication towers, and the RF planning may be performed manually. Conventional systems may not identify communities which need additional capacity, new users should be acquired aggressively.

Hence, there is a need to enable automatic RF planning, strategical decision making of new telecommunication cellular tower placement, supply demand optimization, and so on. Therefore, there is a need in the art to provide systems and methods that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide a robust, efficient and effective systems and methods for determining spatial clusters in a network.

An object of the present disclosure is to provide systems and methods for automatically identify the coherent group of telecommunication cellular towers which are serving the same set of grids (users).

An object of the present disclosure is to provide systems and methods for splitting telecommunication network into community of cells, where all the nodes within each community have a high affinity to each other, but not to nodes in the other community.

An object of the present disclosure is to provide systems and methods for automatic Radio Frequency (RF) planning based on determining spatial clusters in a network.

An object of the present disclosure is to provide systems and methods for strategical decision making of new cell tower placement.

An object of the present disclosure is to implement supply demand optimization in real-time.

An object of the present disclosure is to estimate the affinity between two telecommunication cellular towers.

An object of the present disclosure is to provide polygon formation (serving area) for each cell with moderate precision.

An object of the present disclosure is to identify communities of telecommunication cellular towers which need additional capacity, where demand/capacity ratio is high.

An object of the present disclosure is to identify communities telecommunication cellular towers where new users should be acquired aggressively, where demand/capacity ratio is low.

An object of the present disclosure is to optimize supply-demand for each community of telecommunication cellular towers, which will improve the overall network performance.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for determining spatial clusters in a network. The system may include a clustering device operatively coupled to one or more first computing devices and a second computing device. The one or more computing first devices may be associated with a plurality of cells, and each cell may further have a telecommunication tower. The clustering device may further include a processor that may execute a set of executable instructions that are stored in a memory, upon execution of which, the processor may cause the clustering device to receive, a set of data packets from the one or more first computing devices, the set of data packets pertaining to a set of parameters of each cell associated with one or more sectors. The clustering device may then extract, a first set of attributes from the received set of data packets, the first set of attributes pertaining to a predefined grid of each cell. The clustering device also may extract, a second set of attributes from the received set of data packets, the second set of attributes pertaining to one or more neighbouring grid details of cell. Based on the first and second set of attributes, the clustering device may determine, a cell polygon and a tilt configuration of each cell and then compute an affinity between the one or more sectors of each cell. Based on the affinity computed, the clustering device may then determine an optimal number of clusters of the communication towers serving the predefined grid.

In an embodiment, the set of parameters of the cell of the predefined region may include circle data, city data, cell Identity (ID) data, latitude data, longitude data, azimuth data, and height data, sector id, and geohash.

In an embodiment, the processor may further cause the clustering device may estimate an overlap of the grid and the cell polygon of each cell, and based on the estimated overlap, the clustering device may determine if the cell is serving the grid.

In an embodiment, the processor may obtain the set of parameters of the cells by filtering any or a combination of a set of new cells and a set of cells having different latitude or longitude or azimuth, creating a sector id by combining a set of cells having the same latitude, longitude and azimuth, determining a geohash for the set of cells; and, storing the set of parameters of the cell in a database associated with the second computing device.

In an embodiment, the geohash may be computed for each cell and for one or more neighbouring cells of each cell.

In an embodiment, the sector-id may be determined by merging the geohash of the one or more neighbours with the polygons of each said cell.

In an embodiment, the affinity between one or more sectors may be determined based on merging of the sector-ids and the geohash of each said cell.

In an embodiment, the clustering an optimal number of clusters of the communication towers serving the predefined grid may be based on a determination of a similarity score and a silhouette score of each sector.

In an embodiment, a centralized server may be operatively coupled to the clustering device and the processor may cause the clustering device to send the optimal number of clusters of the communication towers serving the predefined grid through a network. In yet another embodiment, the centralized server may further store grid details, neighbouring grid details, affinity details and the set of parameters of each cell.

In an embodiment, the clustering device may be remotely monitored and the data, application and physical security is fully ensured.

In an aspect, the present disclosure provides for a method for determining spatial clusters in a network. The method may include the steps of receiving, by a clustering device, a set of data packets from one or more first computing devices, the set of data packets pertaining to a set of parameters of each cell associated with one or more sectors. In an embodiment, the clustering device may be operatively coupled to one or more first computing devices and a second computing device. The one or more first computing devices may be associated with a plurality of cells and each cell may further have a telecommunication tower. In an embodiment, the clustering device may further include a processor that executes a set of executable instructions that are stored in a memory. The method may further include the steps of extracting, by the clustering device, a first set of attributes from the set of data packets received, the first set of attributes pertaining to a predefined grid of each cell and extracting, by the clustering device, a second set of attributes from the set of data packets received, the second set of attributes pertaining to one or more neighbouring grid details of cell. Further, the method may include the step of determining, by the clustering device, based on the first and second set of attributes, a cell polygon and a tilt configuration of each cell. Furthermore, the method may include the step of computing, by the clustering device, based on the cell polygon and the tilt configuration, an affinity between the one or more sectors of each the cell and based on the affinity computed, determining, by the clustering device, an optimal number of clusters of the communication towers serving the predefined grid.

BRIEF DESCRIPTION OF DRAWINGS

The accompanying drawings, which are incorporated herein, and constitute a part of this invention, illustrate

Figure 1:
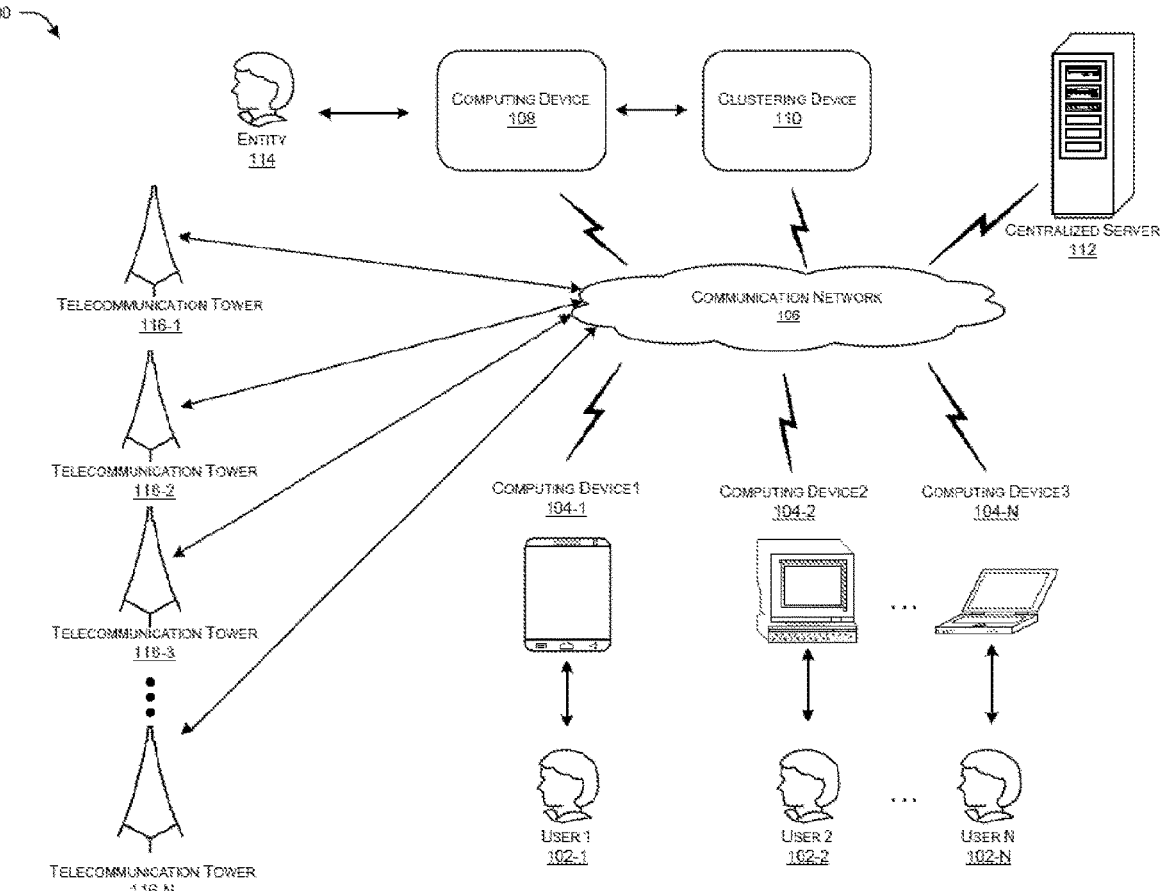

4 exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 1 illustrates an exemplary network architecture in which or with which proposed system of the present disclosure can be implemented, in accordance with an embodiment of the present disclosure.

Figure 2:
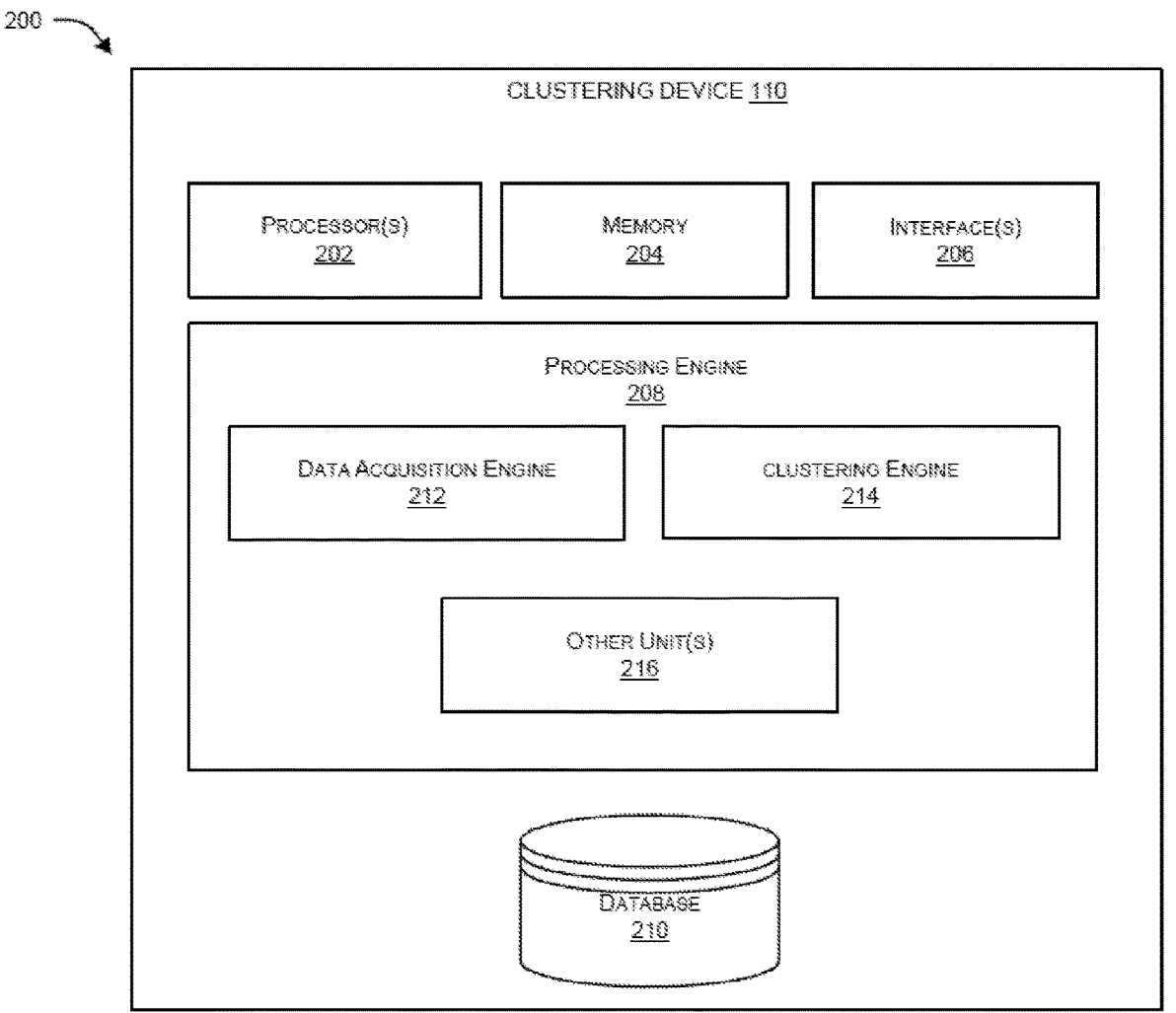

FIG. 2 illustrates an exemplary representation of proposed clustering system/centralized server for determining spatial clusters in a network, in accordance with an embodiment of the present disclosure.

Figure 3:
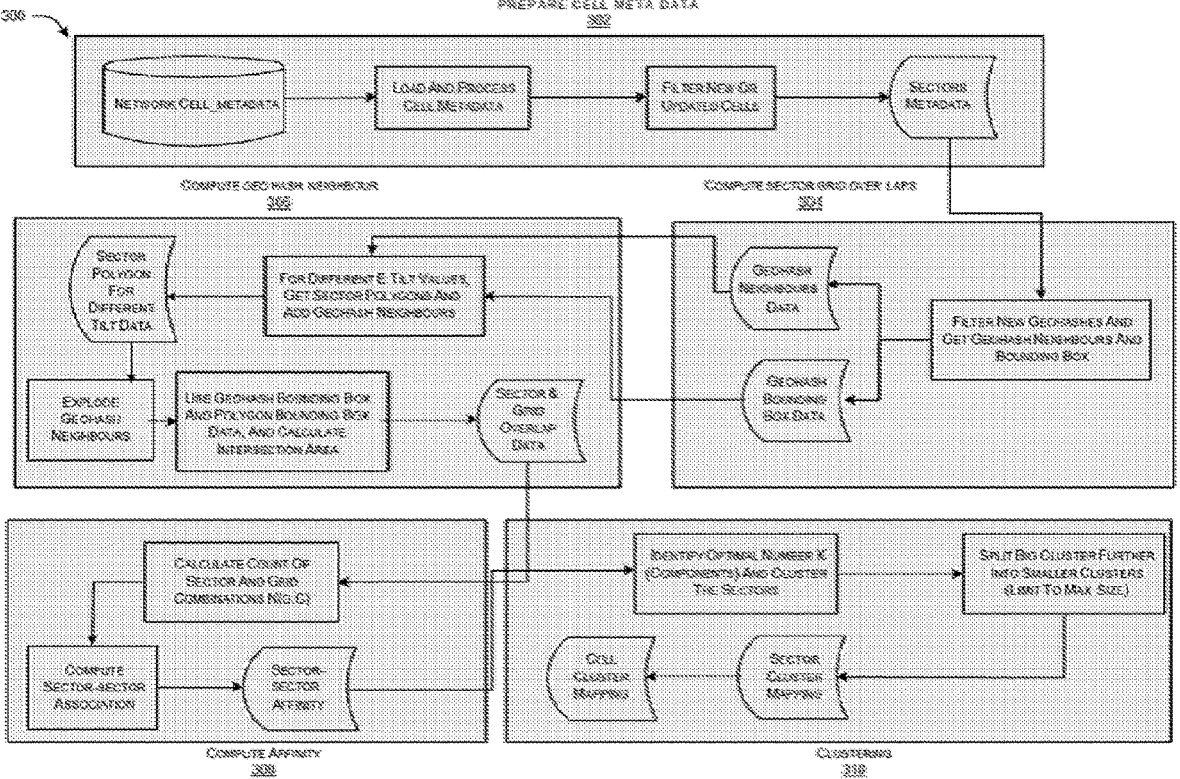

FIG. 3 illustrates an exemplary block diagram representation of a system architecture, in accordance with an embodiment of the present disclosure.

FIG. 4A illustrates an exemplary flow chart depicting a method for determining spatial clusters in a network, in accordance with an embodiment of the present disclosure.

Figure 4B:
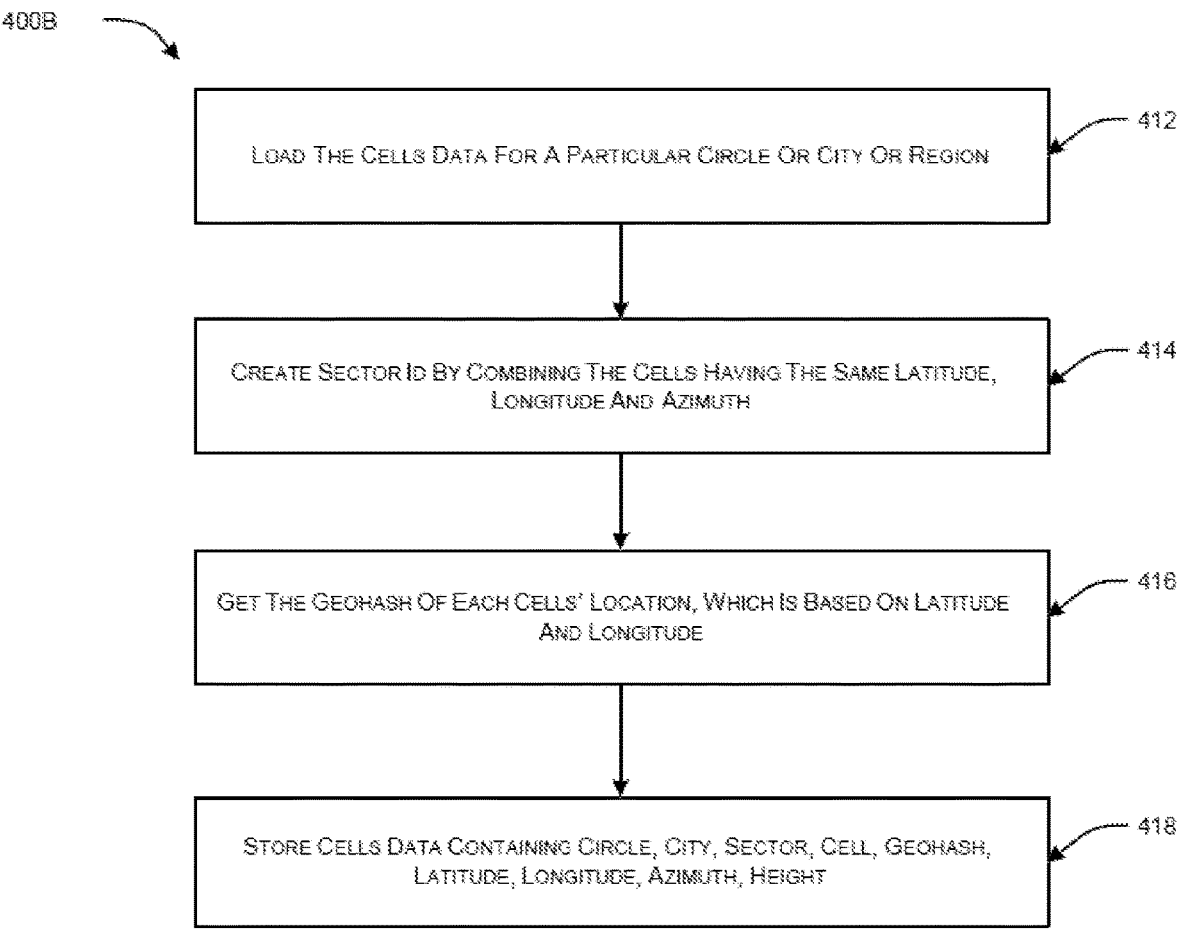

FIG. 4B illustrates an exemplary flow chart depicting a method for preparing cells data while determining spatial clusters in a network, in accordance with an embodiment of the present disclosure.

Figure 4C:
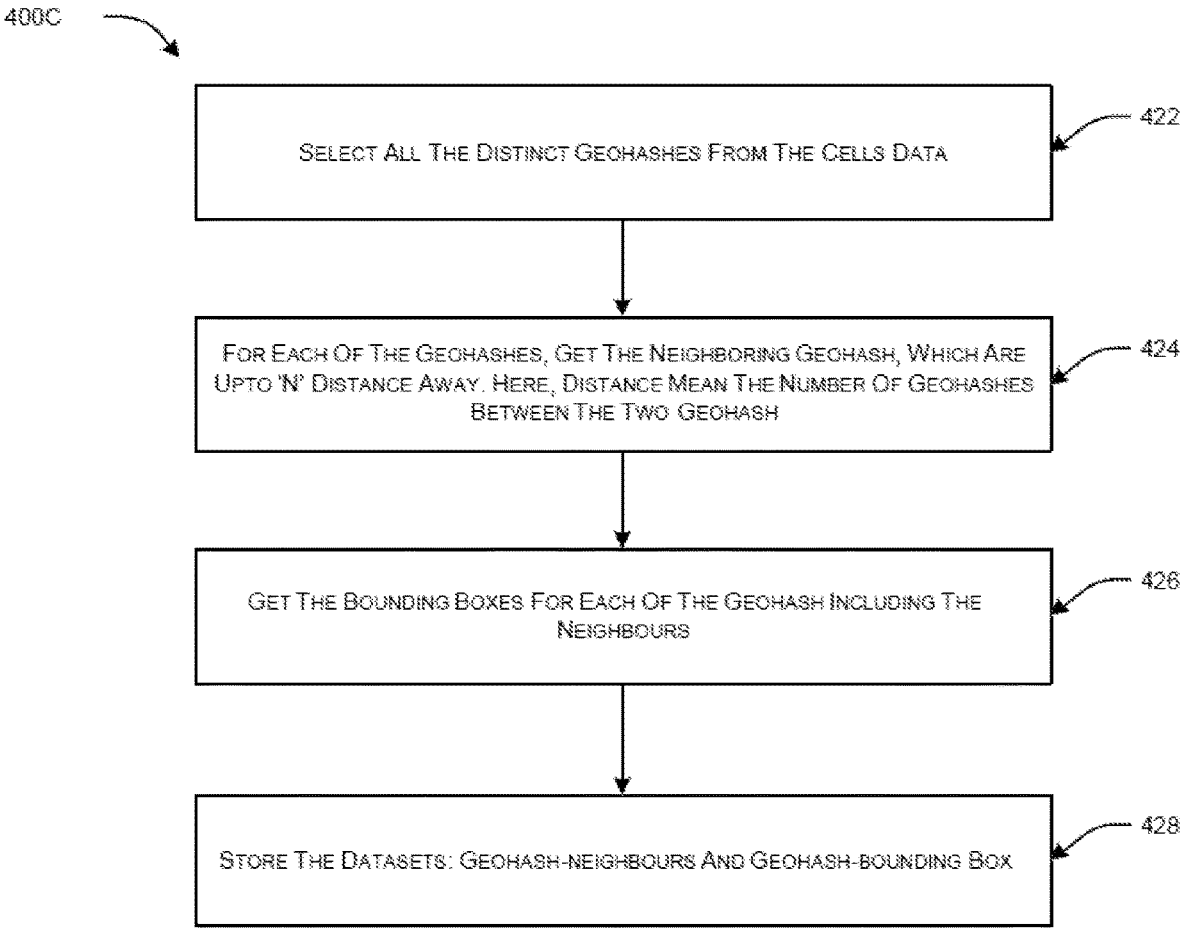

FIG. 4C illustrates an exemplary flow chart depicting a method for preparing Geohash neighbours and bounding box data, in accordance with an embodiment of the present disclosure.

FIG. 4D illustrates an exemplary flow chart depicting a method for computing sectors, in accordance with an embodiment of the present disclosure.

FIG. 4E illustrates an exemplary flow chart depicting a method for computing affinity between the telecommunication cellular towers, in accordance with an embodiment of the present disclosure.

FIG. 4F illustrates an exemplary flow chart depicting a method for finding connected components, in accordance with an embodiment of the present disclosure.

Figure 5A:
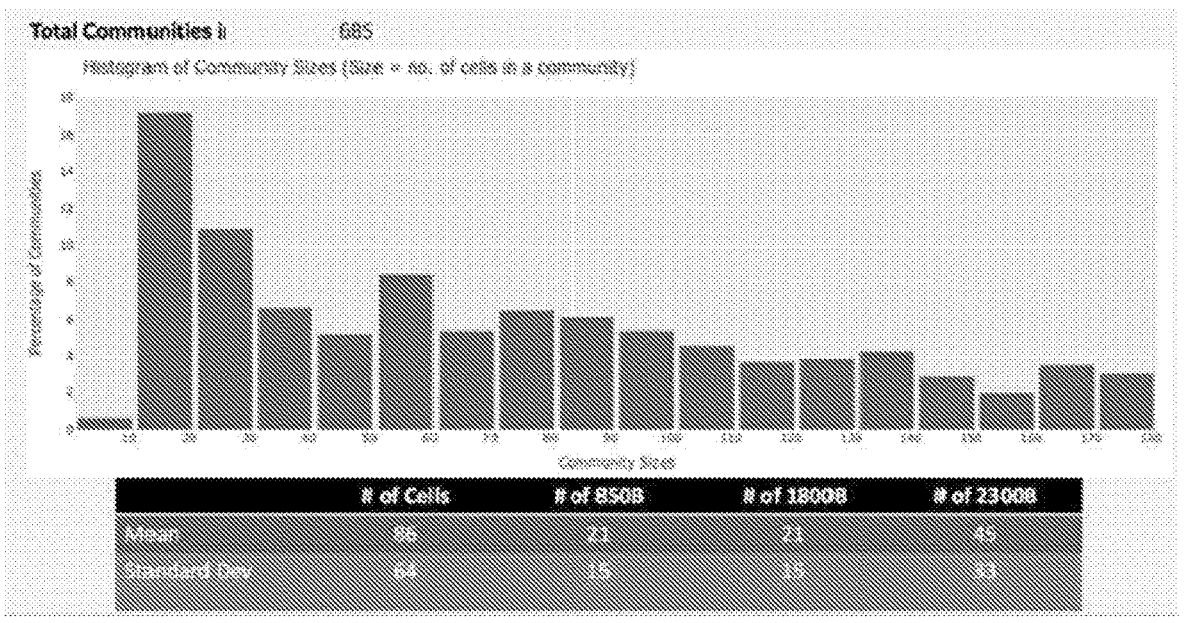

FIG. 5A illustrates a graphical representation of histogram of community sizes, in accordance with an embodiment of the present disclosure.

Figure 5B:
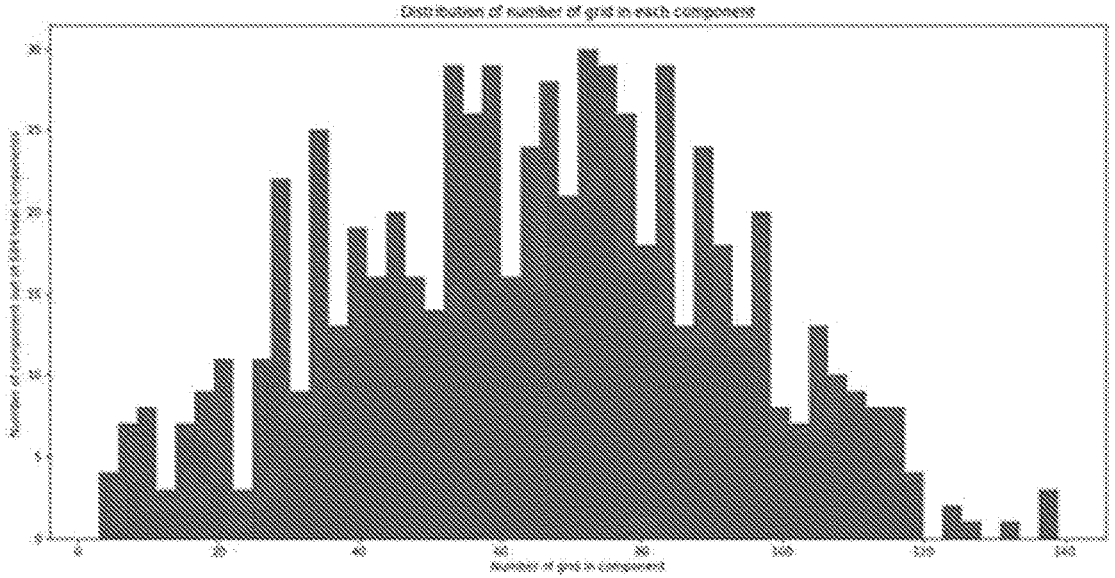

FIG. 5B illustrates a graphical representation of distribution of grid in each component, in accordance with an embodiment of the present disclosure.

Figure 6A:
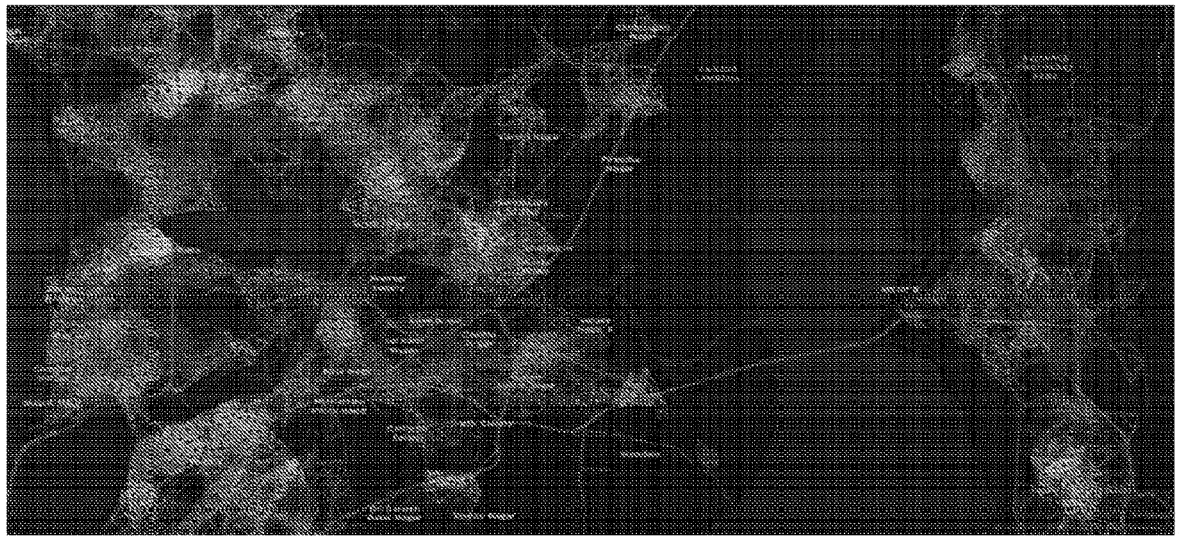
Figure 6B:
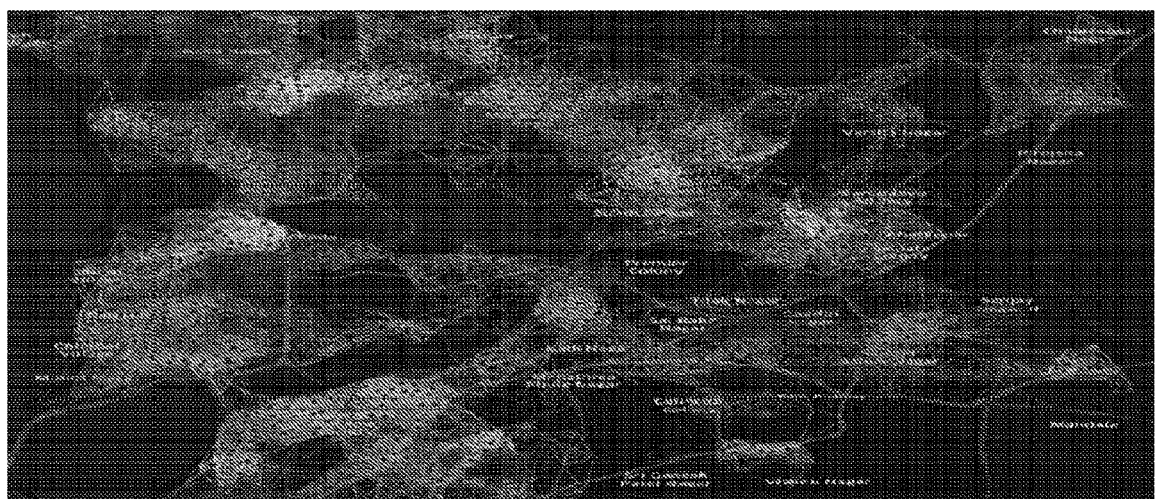

FIGS. 6A and 6B illustrate schematic representations of spatial clusters of telecommunication towers, in accordance with an embodiment of the present disclosure.

Figure 7:
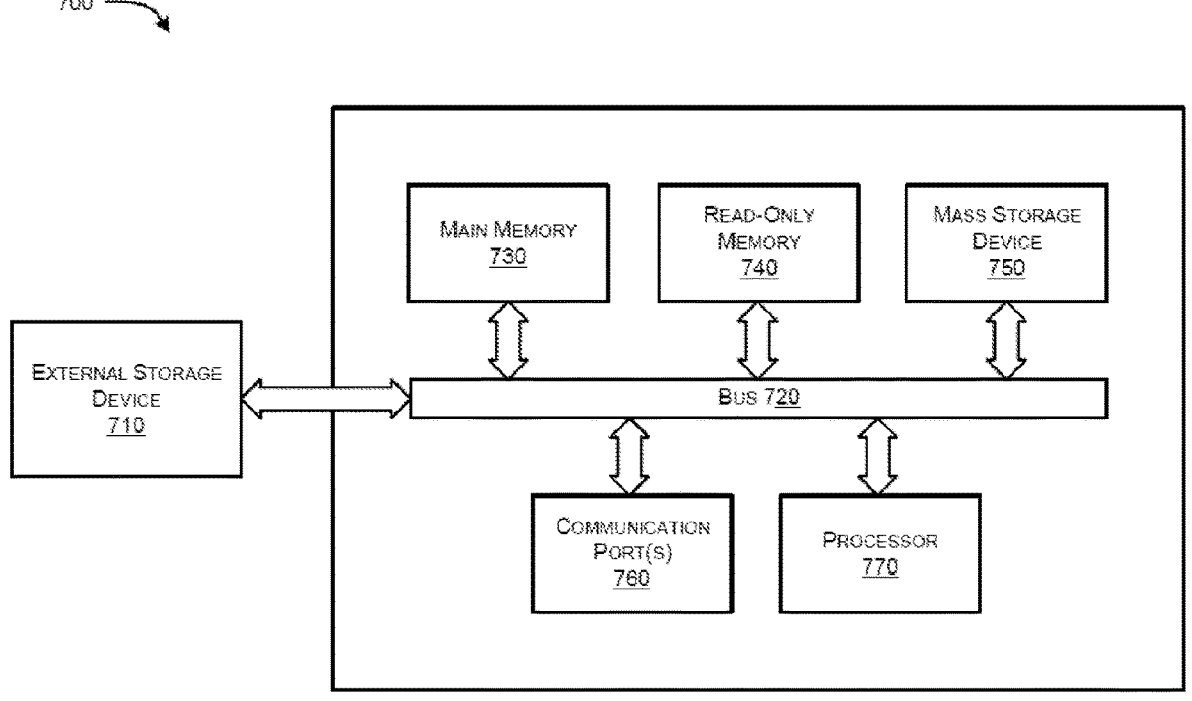

FIG. 7 illustrates an exemplary computer system in which or with which embodiments of the present invention can be utilized, in accordance with embodiments of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The term "Geohash" refers to a unique identifier of a specific region on the Earth. The basic idea is that the Earth is divided into regions of user-defined size and each region is assigned a unique id, which is called its Geohash. For a given location on earth, the Geohash algorithm converts its latitude and longitude into a string.

The term "community" refers to a subset of nodes within the graph such that connections between the nodes are denser than connections with the rest of the network.

The present invention provides robust, efficient and effective systems and methods for determining spatial clusters in a network. The present disclosure provides systems and methods for automatically identifying the coherent group of telecommunication cellular towers which are serving the same set of grids (users). The present disclosure provides systems and methods for splitting telecommunication network into community of cells, where all the nodes within each community have a high affinity to each other, but not to nodes in the other community. The present disclosure provides systems and methods for automatic Radio Frequency (RF) planning based on spatial clusters in a network. The present disclosure provides systems and methods for strategical decision making of new cell tower placement. The present disclosure implements supply demand optimization in real-time. The present disclosure estimates the affinity between two telecommunication cellular towers. The present disclosure provides polygon formation (serving area) for each cell with moderate precision. The present disclosure identifies communities of telecommunication cellular towers which need additional capacity, where demand/capacity ratio is high. The present disclosure identifies communities of telecommunication cellular towers where new users should be acquired aggressively, where demand/capacity ratio is low. The present disclosure optimizes supply-demand for each community of telecommunication cellular towers, which will improve the overall network performance.

Referring to FIG. 1 that illustrates an exemplary network architecture for a spatial clustering system (100) (also referred to as network architecture (100)) in which or with which a clustering device (110) or simply referred to as the system (110) of the present disclosure can be implemented, in accordance with an embodiment of the present disclosure. As illustrated, the exemplary architecture (100) may include telecommunication cellular towers (116-1, 116-2, 116-3, . . . , 116-N) (individually referred to as the telecommunication tower (116) and collectively referred to as the telecommunication towers (116)) communicatively coupled to users (102-1, 102-2, 102-3 . . . 102-N) (individually referred to as the user (102) and collectively referred to as the users (102)) associated with one or more first computing devices (104-1, 104-2 . . . 104-N) (individually referred to as the first computing device (104) and collectively referred to as the first computing devices (104)). The telecommunication towers (116) may be a cellular base station, where antennas and electronic communications equipment may be placed typically on a radio mast, tower, or other raised structure to create a cell (or adjacent cells) in a cellular network. The raised structure typically supports antenna and one or more sets of transmitter/receiver, transceivers, digital signal processors, control electronics, a GPS receiver for timing (for Code-division multiple access (CDMA) 2000/IS-95 or Global System for Mobile communication (GSM) systems), primary and backup electrical power sources, and sheltering. A cellular network may be a network of the first computing devices (104) in which each first computing device (104) communicates with the telephone network by radio waves through the telecommunication towers (116). The coverage area in which service is provided may be divided into a mosaic of small geographical areas called "cells", each served by a separate low power multichannel transceiver and telecommunication towers (116) at a base station. A cell is a geographic area that is covered by a single base station in a cellular network. While, a "sector" refers to a specific sector emanating from a telecommunication tower. The number of sectors around a cell tower may vary by cellular provider but typically involve three separate 120-degree, pie-shaped arcs connected to form a circle of 360-degree coverage around the cell tower. A grid is a complex, multi-tiered network-of-networks that can manage and integrate diverse technologies and facilitate the rapid, seamless flow of information. For example, at the top of the grid telecommunications hierarchy are wide area networks (WAN). Further, when planning a cellular network, operators typically allocate different frequency bands or channels to adjacent cells so that interference is reduced even when the coverage areas overlap slightly. In this way, cells can be grouped together in what is termed a cluster.

In an embodiment, the telecommunication towers (116) may be located at the edge of one or more cells and covers multiple cells using directional antennas. A common geometry is to locate the cell site at the intersection of three adjacent cells, with three antennas at 120° angles each covering one cell.

As illustrated, the exemplary architecture (100) may be equipped with the clustering system (110) for facilitating determination of spatial clusters in a network to a second computing device (108) associated with an entity (114). The entity (114) may include a company, an organisation, a university, a lab facility, a business enterprise, a defence facility, or any other secured facility. In some implementations, the system (110) may also be associated with the second computing device (108). Further, the system (110) may also be communicatively coupled to the one or more first computing devices (104) via a communication network (106).

The system (110) may be coupled to a centralized server (112). The centralized server (112) may also be operatively coupled to the one or more first computing devices (104) and the second computing devices (108) through the communication network (106). In some implementations, the system (110) may also be associated with the centralized server (112).

In an embodiment, the system (110) may receive a set of data packets from the one or more first computing devices (104). The first set of data packets may pertain to a set of parameters of the cell. The set of parameters of the cell may be prepared using one or more, but not limited to, circle data, city data, cell Identity (ID) data, latitude data, longitude data, azimuth data, height data and the like.

In an embodiment, the system (110) may extract, a first set of attributes from the set of data packets received pertaining to a predefined grid of each cell and then extract, a second set of attributes from the set of data packets received pertaining to one or more neighbouring grid details of each cell.

In an embodiment, the system (110) may compute geohash based on creating geohash neighbours and geohash bounding box data. In an embodiment, the system (110) may compute sectors of the telecommunication towers (116).

In an embodiment, the system (110) may compute sector affinity of the telecommunication towers (116). In an embodiment, the system (110) may perform clustering of the telecommunication towers (116) based on but not limited to an elbow curve with which a cost minimal point can be obtained.

In an embodiment, the processor may further cause the clustering device (110) to send the optimal number of clusters of the communication towers (116) serving the predefined grid through the network (106). In another embodiment, the centralized server (112) may further store grid details, neighbouring grid details, affinity details and the set of parameters of each cell.

In an embodiment, the system (110) may be a System on Chip (SoC) system but not limited to the like. In another embodiment, an onsite data capture, storage, matching, processing, decision-making and actuation logic may be coded using Micro-Services Architecture (MSA) but not limited to it. A plurality of microservices may be containerized and may be event based in order to support portability.

In an embodiment, the network architecture (100) may be modular and flexible to accommodate any kind of changes in the system (110) as proximate processing may be acquired towards determining spatial clusters in the network. The system (110) configuration details can be modified on the fly.

In an embodiment, the system (110) may be remotely monitored and the data, application and physical security of the system (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, the communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an Internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, the server (112) may be included in architecture (100). The server may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more first computing devices (104) and the second computing device (108) may communicate with the system (110) via set of executable instructions residing on any operating system, including but not limited to, Android™, iOS™, Kai OS™ and the like. In an embodiment, one or more first computing devices (104) and the second computing device (108) may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (104), and the second computing device (108) may not be restricted to the mentioned devices and various other devices may be used. A smart computing device may be one of the appropriate systems for storing data and other private/sensitive information.

FIG. 2 illustrates an exemplary representation of the proposed clustering system (110) for determining spatial clusters in the network, in accordance with an embodiment of the present disclosure. In an aspect, the system (110) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) 206. The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry. Further, the system (110) may include Machine Learning (ML) modules.

The processing engine (208) may include one or more engines selected from any of a data acquisition engine (212), clustering engine (214), and other engines (216). The data acquisition engine (212), clustering acquisition engine (214) may include Machine Learning (ML) modules. The processing engine (208) may further edge based micro service event processing but not limited to the like.

FIG. 3 illustrates an exemplary block diagram representation of a system architecture (300) in reference to FIG. 1, in accordance with an embodiment of the present disclosure.

In an embodiment, the system architecture (300) may include modules such as a cell meta data preparing module (302), a geohash neighbour computing module (304), a sector grid overlaps computing module (306), an affinity computing module (308), and a clustering module (310).

In an embodiment, the cell meta data preparing module (302) may obtain data, but not limited to circle data, city data, cell Identity (ID) data, latitude data, longitude data, azimuth data, height data, and the like. The cell meta data preparing module (302) may load the latest cells data and remove null records. Further, the cell meta data preparing module (302) may filter only those cells which are either new (did not exist previously) or their latitude or longitude or azimuth has changed. Further, the cell meta data preparing module (302) may create sector Identity (ID) by combining the cells having the same latitude, longitude and azimuth. The cell meta data preparing module (302) may obtain geohash for each cell based on cell latitude and longitude. Thereafter, the cell meta data preparing module (302) store dataset which includes, but not limited to circle data, city data, sector Identity (ID), cell ID data, geohash data, latitude data, longitude data, azimuth data, height data, and the like.

In an embodiment, the geohash neighbour computing module (304) may select all distinct geohashes from the cells data and filter only the new geohashes, i.e. the ones for which neighbours and bounding boxes have not been computed previously. For each of the geohashes, the geohash neighbour computing module (304) may obtain the neighbouring geohashes which are up to 'n' distance/geohashes/grids away. Further, the geohash neighbour computing module (304) may obtain the bounding box that is the coordinates containing a geohash, for all the geohashes including the neighbours. Furthermore, the geohash neighbour computing module (304) may create two data sets which includes, geohash neighbours and geohash bounding box data.

In an embodiment, the sector grid overlaps computing module (306) may identify overlapping grids for different tilt configurations for each sector. The sector grid overlaps computing module (306) may load the cells data. For different tilt configurations for each of the sector, the sector grid overlaps computing module (306) may obtain the polygons, i.e. the co-ordinates containing the approximate area served by each sector with a particular tilt configuration. Furthermore, the sector grid overlaps computing module (306) may merge the geohash-neighbours data with the sector-polygons data and store the data. This data may include but not limited to, sector, geohash, neighbours, sector polygon, and the like. Also, in the same data, the sector grid overlaps computing module (306) may explode/expand the neighbours column and calculate the intersection area between the sector-polygon and geohash-bounding box. In an embodiment, the sector grid overlaps computing module (306) may retain only those records where, intersection area is greater than a predefined threshold and store the sector-geohash data. In an embodiment, the predefined threshold may be determined by analyzing a histogram data obtained from the data received from the cells. This data may include, but not limited to, sector, tilt, geohash, sector polygon, geohash bounding box, intersection area, latitude, longitude, and the like.

In an embodiment, the affinity computing module (308) may load sector-geohash data and make a copy of sector-geohash data. Then, the affinity computing module (308) may merge the two datasets on geohash where pair of sectors indicate the sectors serving the same grid. After merging, the affinity computing module (308) may calculate the haversine distance between the latitude and longitude of the pair of sectors and keep only those pairs having are at some fixed distance apart from each other. On the same data, the affinity computing module (308) may also merge the total demand of the geohash/grid. The affinity computing module (308) may calculate affinity based on equation 1 below:

$$W(S_x, S_z) = \frac{\sum_{g \in G(s_x) \cap G(s_z)} n(s_x, g) n(s_z, g) d(g)^\beta}{\sqrt{\sum_{g \in G(s_x)} d(g)^\beta n(s_x, g)^2} \sqrt{\sum_{g \in G(s_y)} d(g)^\beta n(s_z, g)^2}} \qquad \text{Equation 1}$$

In the above equation 1, the term "d(g)" may refer to demand of the grid "g" (in this context, maximum of day), the term "$\beta \in \{0,1\}$" may refer to demand weighted ($\beta=1$) vs. demand agnostic ($\beta=0$). Further, the term "G(c, t)" may refer to set of grids in the polygon of cell "c" at tilt "t". The term $G(c, t)=\{g|g \in \text{Polygon}(c, t)\}$, the term "n(c, g) may refer to tilts of the cell "c" containing the grid "g", the term $n(c, g)=\sum_t I(g \in G(c, t))$.

In an embodiment, the clustering module (310) may create affinity matrix ($A=R^{\wedge}(N,N)$, where "N" is the number of sectors. The clustering module (310) may obtain the optimal number of partitions using Elbow method. For a range of values of "k" (number of clusters/components), the clustering module (310) may partition the sectors into "k" clusters and calculate an overall silhouette score. Then, for the value of "k" for which the silhouette score is the highest, the clustering module (310) may select "K" as the optimal number of clusters and the sectors are finally partitioned into "k" clusters. For each cluster, the clustering module (310) may check if the size of the cluster is greater than a certain threshold (maximum clusters size) and if it is, the clustering module (310) may continue partitioning it into two sub-components/clusters, until all the sub-components have size less than the maximum clusters size/threshold. After, all of the above steps, the clustering module (310) may obtain the final list of cluster-sector mapping. In an embodiment, the clustering process may involve the following steps:

using the Affinity matrix (A), create the graph Laplacian matrix (L).

calculate the Eigen values and Eigen vectors on the Laplacian matrix (L).

sort the Eigen vectors in ascending order based on Eigen values.

run the K means clustering algorithm for k components, on the first k Eigen vectors (optionally 1st vector can be dropped).

The silhouette coefficient calculation may be defined as follows: Silhouette Coefficient or silhouette score is a metric used to calculate the goodness of a clustering technique. Its value ranges from −1 to 1.

a. 1: Means clusters are well apart from each other and clearly distinguished.

b. −0: Means clusters are indifferent, or we can say that the distance between clusters is not significant.

c. −1: Means clusters are assigned in the wrong way.

Convert similarity score between two sectors into distance score using equation 2 below:

$$\text{distance}(s_x, s_y) = \frac{1 - \text{similarity}(s_x, s_y)}{1 + \text{similarity}(s_x, s_y)} \qquad \text{Equation 2}$$

Calculate Silhouette score for each sector. Intra-cluster distance measure may be provided using equation 3 below:

$$a_{s_x} = \frac{1}{|C(s_x)| - 1} \sum_{s_i \in C(s_x), s_i \neq s_x} \text{distance}(s_x, s_i) \qquad \text{Equation 3}$$

Inter-cluster distance measure may be provided using equation 4 below:

$$b_{s_x} = \min_{c \in C, c \neq C(s_x)} \frac{1}{|c|} \sum_{s_j \in c} \text{distance}(s_x, s_j) \qquad \text{Equation 4}$$

Silhouette score may be provided using equation 5 below:

$$\text{score}(s_x) = \frac{b_{s_x} - a_{s_x}}{\max(a_{s_x}, b_{s_x})} \qquad \text{Equation 5}$$

Calculate score for each cluster may be provided using equation 6 below:

$$\text{score\_cluster}_c = \frac{1}{|c|} \sum_{s_j \in c} \text{score}(s_j) \qquad \text{Equation 6}$$

Calculate overall score may be provided using equation 7 below:

$$\text{overall\_score} = \frac{1}{\sum_{c \in C} |C|} \sum_{c \in C} \sum_{s_j \in c} \text{score}(s_j) \qquad \text{Equation 7}$$

FIG. 4A illustrates an exemplary flow chart depicting a method (400A) for determining spatial clusters in a network, in accordance with an embodiment of the present disclosure.

At block (402), the method (400A) may include loading, by the processor (202), the cells data for a particular circle or city or region. At block (404), the method (400A) may include identifying, by the processor (202), the grid for each cell and identify all the neighbouring grids for each of cells' grid. At block (406), the method (400A) may include estimating, by the processor (202), the polygon for each cell and tilt configuration and estimate the overlap of grid and cell polygon, to find out if this cell is serving this grid. At block (408), the method (400A) may include computing, by the processor (202), the affinity between sectors of each cell tower. At block (410), the method (400A) may include computing, by the processor (202), the optimal number of clusters on the N×N affinity matrix using spectral clustering.

FIG. 4B illustrates an exemplary flow chart depicting a method (400B) for preparing cells data while determining spatial clusters in a network, in accordance with an embodiment of the present disclosure.

At block (412), the method (400B) may include loading, by the processor (202), the cells data for a particular circle or city or region. At block (414), the method (400B) may include creating, by the processor (202), sector ID by combining the cells having the same latitude, longitude and azimuth. At block (416), the method (400B) may include obtaining, by the processor (202), the geohash of each of the cell's location, which is based on latitude and longitude. At block (418), the method (400B) may include storing, by the processor (202), cells data containing circle, city, sector, cell, geohash, latitude, longitude, azimuth, height.

FIG. 4C illustrates an exemplary flow chart depicting a method (400C) for preparing geohash neighbours and bounding box data, in accordance with an embodiment of the present disclosure.

At block (422), the method (400C) may include selecting, by the processor (202), all the distinct geohashes from the cells data. At block (424), the method (400C) may include obtaining, by the processor (202), for each of the geohashes, the neighbouring geohash, which are up to 'n' distance away. Here, distance refers to the number of geohashes between the two geohash. At block (426), the method (400C) may include, obtaining, by the processor (202), the bounding boxes for each of the geohash including the neighbours. At block (428), the method (400C) may include, storing, by the processor (202), the datasets which includes, geohash-neighbours and geohash-bounding box.

FIG. 4D illustrates an exemplary flow chart depicting a method (400D) for computing sectors, in accordance with an embodiment of the present disclosure.

At block (432), the method (400D) may include, loading, by the processor (202), the cells data. At block (434), the method (400D) may include obtaining, by the processor (202), for different tilt configurations for each sector, the polygons i.e. the co-ordinates covering the area which will approximately be served by a sector with a particular tilt. At block (436), the method (400D) may include merging, by the processor (202), the sector-polygons data and geohash-neighbour's data. At block (438), the method (400D) may include calculating, by the processor (202), the intersection area between the sector-polygons and geohash-bounding box and keep only the records where area is greater than a certain threshold. At block (440), the method (400D) may include calculating, by the processor (202), calculate the intersection area between the sector-polygons and geohash

13

14 bounding box and keep only the records where area is greater than a certain threshold.

FIG. 4E illustrates an exemplary flow chart depicting a method (400E) for computing affinity between the telecommunication cellular towers, in accordance with an embodiment of the present disclosure.

At block (442), the method (400E) may include loading, by the processor (202), sector-geohash data and make a copy of sector-geohash data. Then, the method may merge the two datasets on geohash, where pair of sectors indicate sectors serving the same grid. At block (444), the method (400E) may include calculating, by the processor (202), the haversine distance between the latitude and longitudes of the pair of sectors and keep only those pairs, which are within a certain distance from each other. At block (446), the method (400E) may include merging, by the processor (202), the geohash's demand with the sector-pairs data. At block (448), the method (400E) may include calculating, by the processor (202), the affinity score between each pair of sectors, based on a formula.

FIG. 4F illustrates an exemplary flow chart depicting a method for finding connected components, in accordance with an embodiment of the present disclosure.

At block (452), the method (400F) may include loading, by the processor (202), the sector-sector affinity score data in the form of NxN matrix. At block (454), the method (400F) may include identifying, by the processor (202), the optimal number of clusters (k) may execute the Spectral Clustering on a range of values of k and may calculate Silhouette score for each run. Then using the Elbow curve method identify the optimal value of k.

At block (456A), the method (400F) may include clustering, by the processor (202), the sectors into 'k' groups and further partition any cluster having size greater than a certain threshold. For each cluster, at block (456B), the method (400F) may include checking, by the processor (202), cluster size. If the cluster is greater than threshold, then at block (456C), the method (400F) may include partitioning, by the processor (202), the cluster into two groups. Then the steps (400B) and (400C) may repeat. If the cluster is lesser than threshold, then at block (456C), the method (400F) may terminate. At block (458), the method (400F) may include storing, by the processor (202), the sector, cell and their corresponding cluster group.

FIG. 5A illustrates a graphical representation of histogram of community sizes, in accordance with an embodiment of the present disclosure.

In the graph, the x axis may correspond to community sizes of the telecommunication towers (116), and the y axis may correspond to percentage of the communities. The size of the community is the number of cells in a community.

FIG. 5B illustrates a graphical representation of distribution of grid in each component, in accordance with an embodiment of the present disclosure.

In the graph, the x axis may include number of grids in the component, and the y axis may include a number of components out of for example, 684 total components.

FIGS. 6A and 6B illustrate schematic representations of spatial clusters of telecommunication towers, in accordance with an embodiment of the present disclosure.

The grid or spatial clusters of the telecommunication tower (116) may be shown in FIGS. 6A and 6B. For different tilt configurations for each of the sector, the method may include getting the polygons, i.e., the co-ordinates containing the approximate area served by each sector with a particular Tilt configuration and then the method may include merging the geohash-neighbour's data with the sector-polygons data and store this data. This data will contain, sector, geohash, neighbours, sector polygon. Also, in the same data, the neighbours' column may be exploded and then the method may calculate the intersection area between the sector-polygon and geohash-bounding box, keeping only those records where, intersection area is greater than a threshold and store the sector-geohash data. This data will contain sector, tilt, geohash, sector polygon, geohash bounding box, intersection area, latitude, longitude. Thus, the system and method provide a robust, efficient and effective systems and methods for determining spatial clusters in a network.

FIG. 7 illustrates an exemplary computer system in which or with which embodiments of the present invention can be utilized in accordance with embodiments of the present disclosure. As shown in FIG. 6, computer system (700) can include an external storage device (710), a bus (720), a main memory (730), a read only memory 740, a mass storage device (750), communication port (760), and a processor (770). A person skilled in the art will appreciate that the computer system may include more than one processor and communication ports. Examples of processor (770) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (770) may include various modules associated with embodiments of the present invention. Communication port (760) can be any of an RS-232 port for use with a modem based dialup connection, a 10/100 Ethernet port, a Gigabit or 10 Gigabit port using copper or fiber, a serial port, a parallel port, or other existing or future ports. Communication port (760) may be chosen depending on a network, such a Local Area Network (LAN), Wide Area Network (WAN), or any network to which computer system connects. Memory (730) can be Random Access Memory (RAM), or any other dynamic storage device commonly known in the art. Read-only memory (740) can be any static storage device(s) e.g., but not limited to, a Programmable Read Only Memory (PROM) chips for storing static information e.g., start-up or BIOS instructions for processor 770. Mass storage (750) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus (720) communicatively couples processor(s) (770) with the other memory, storage and communication blocks. Bus (720) can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor (770) to software system.

Optionally, operator and administrative interfaces, e.g. a display, keyboard, and a cursor control device, may also be coupled to bus (720) to support direct operator interaction with a computer system. Other operator and administrative interfaces can be provided through network connections connected through communication port (760). The external storage device (710) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the afore-mentioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present invention provides a robust, efficient and effective systems and methods for determining spatial clusters in a network.

The present disclosure provides systems and methods for automatically identify the coherent group of telecommunication cellular towers which are serving the same set of grids (users).

The present disclosure provides systems and methods for splitting telecommunication network into community of cells, where all the nodes within each community have a high affinity to each other, but not to nodes in the other community.

The present disclosure provides systems and methods for automatic Radio Frequency (RF) planning based on deter-mining spatial clusters in a network.

The present disclosure provides systems and methods for strategical decision making of new cell tower placement. The present disclosure implements supply demand optimi-zation in real-time.

The present disclosure estimates the affinity between two telecommunication cellular towers.

The present disclosure provides polygon formation (serv-ing area) for each cell with moderate precision.

The present disclosure identifies a set of telecommunica-tion cellular towers which need additional capacity, where demand/capacity ratio is high.

The present disclosure identifies a set of telecommunica-tion cellular towers where new users should be acquired aggressively, where demand/capacity ratio is low.

The present disclosure optimizes supply-demand for each community of telecommunication cellular towers, which will improve the overall network performance.

We claim:

1. A method for determining spatial clusters in a network, said method comprising:

receiving, by a clustering device, a set of data packets from one or more first computing devices, said set of data packets pertaining to a set of parameters of each cell associated with one or more sectors, wherein the clustering device is operatively coupled to the one or more first computing devices and a second computing device, wherein the one or more first computing devices are associated with a plurality of cells, wherein each cell is further having a telecom-munication tower, and wherein, said clustering device further comprises a processor that executes a set of executable instructions that are stored in a memory;

extracting, by the clustering device, a first set of attributes from the set of data packets received, the first set of attributes pertaining to a predefined grid of each said cell;

extracting, by the clustering device, a second set of attributes from the set of data packets received, the second set of attributes pertaining to one or more neighbouring grid details of said cell;

determining, by the clustering device, based on the first and second set of attributes, a cell polygon and a tilt configuration of each said cell;

computing, by the clustering device, based on the cell polygon and the tilt configuration, an affinity between the one or more sectors of each said cell;

and based on the affinity computed, determining, by the clustering device, an optimal number of clusters of the communication towers serving the predefined grid.

2. The method as claimed in claim 1, wherein the set of parameters of the cell comprises circle data, city data, cell Identity data, latitude data, longitude data, azimuth data, height data, sector id, and geohash.

3. The method as claimed in claim 1, wherein the method further comprises:

estimating, by the clustering device, an overlap of the grid and the cell polygon of each said cell; and, based on the estimated overlap, determining by clustering device, if said cell is serving the predefined grid.

4. The method as claimed in claim 2, wherein the method further comprises:

filtering any or a combination of a set of new cells and a set of cells having different latitude or longitude or azimuth;

creating a sector id by combining a set of cells having the same latitude, longitude and azimuth;

determining a geohash for the set of cells; and storing the set of parameters of the cell in a database associated with the second computing device.

5. The method as claimed in claim 4, wherein the method further comprises:

computing the geohash for each cell and for one or more neighbouring cells of each said cell.

6. The method as claimed in claim 4, wherein the method further comprises:

determining the sector-id by merging the geohash of the one or more neighbours with the polygons of each said cell.

7. The method as claimed in claim 1, wherein the affinity between one or more sectors are based on merging of sector-ids and geohash of each said cell.

8. The method as claimed in claim 1, wherein method further comprises:

determining a similarity score and a silhouette score of each sector to further determine the clustering an optimal number of clusters of the communication tow-ers serving the predefined grid.

9. The method as claimed in claim 1, wherein a central-ized server is operatively coupled to the clustering device, wherein the method comprises the step of sending the optimal number of clusters of the communication towers serving the predefined grid through a network, wherein the centralized server further stores grid details, neighbouring grid details, affinity details and the set of parameters of each cell.

10. The method as claimed in claim 1, wherein the clustering device is remotely monitored and the data, application and physical security is fully ensured.

11. A system for determining spatial clusters in a network, said system comprising:

a clustering device operatively coupled to one or more first computing devices and a second computing device, wherein the one or more first computing devices are associated with a plurality of cells, wherein each cell further having a telecommunication tower, and wherein, said clustering device further comprises a processor that executes a set of executable instructions that are stored in a memory, upon execution of which, the processor causes the clustering device to:

receive, a set of data packets from the one or more first computing devices, said set of data packets pertaining to a set of parameters of each cell associated with one or more sectors;

extract, a first set of attributes from the received set of data packets, the first set of attributes pertaining to a predefined grid of each said cell;

extract, a second set of attributes from the received set of data packets, the second set of attributes pertaining to one or more neighbouring grid details of said cell;

determine, based on the first and second set of attributes, a cell polygon and a tilt configuration of each said cell;

compute, based on the cell polygon and the tilt configuration, an affinity score between the one or more sectors of each said cell;

and based on the computed affinity score, determine an optimal number of clusters of the communication towers serving the predefined grid.

12. The system as claimed in claim 11, wherein the set of parameters of the cell comprises circle data, city data, cell Identity data, latitude data, longitude data, azimuth data, height data, sector id, and geohash.

13. The system as claimed in claim 11, wherein the processor further causes the clustering device to estimate an overlap of the grid and the cell polygon of each said cell, and based on the estimated overlap, the clustering device determines if said cell is serving the grid.

14. The system as claimed in claim 12, wherein processor obtains the set of parameters of the cells by causing the clustering device to:

filter any or a combination of a set of new cells and a set of cells having different latitude or longitude or azimuth;

create a sector id by combining a set of cells having the same latitude, longitude and azimuth;

determine a geohash for the set of cells; and store the set of parameters of the cell in a database associated with the second computing device.

15. The system as claimed in claim 14, wherein the geohash is computed for each cell and for one or more neighbouring cells of each said cell.

16. The system as claimed in claim 14, wherein the sector-id is determined by merging the geohash of the one or more neighbours with the polygons of each said cell.

17. The system as claimed in claim 11, wherein the affinity score between one or more sectors is dependent on merging of sector-ids and geohash of each said cell.

18. The system as claimed in claim 11, wherein the clustering an optimal number of clusters of the communication towers serving the predefined grid is further based on a determination of a similarity score and a silhouette score of each sector.

19. The system as claimed in claim 11, wherein a centralized server is operatively coupled to the clustering device, wherein the processor causes the clustering device to send the optimal number of clusters of the communication towers serving the predefined grid through a network, wherein the centralized server further stores grid details, neighbouring grid details, affinity score details and the set of parameters of each cell.

20. The system as claimed in claim 11, wherein the clustering device is remotely monitored and the data, application and physical security is fully ensured.

* * * * *